United States Patent [19]
Dodds et al.

[11] Patent Number: 4,947,698
[45] Date of Patent: Aug. 14, 1990

[54] ROTATIONAL TO LINEAR ACTUATOR

[75] Inventors: Kevin J. Dodds, Edina; Isaac Kaminer, New Hope, both of Minn.

[73] Assignee: Zero-Max Industries Inc., Minneapolis, Minn.

[21] Appl. No.: 355,211

[22] Filed: May 24, 1989

Related U.S. Application Data

[63] Continuation of Ser. No. 214,705, Jul. 1, 1988, abandoned.

[51] Int. Cl.$^5$ .............................................. F16H 19/02
[52] U.S. Cl. .............................................. 74/25; 74/89
[58] Field of Search .............. 74/25, 89, 206; 403/13, 403/14, 24

[56] References Cited

U.S. PATENT DOCUMENTS

| | | | |
|---|---|---|---|
| 3,272,021 | 9/1966 | Weber | 74/25 |
| 3,398,599 | 8/1968 | Hill | 74/441 |
| 4,203,328 | 5/1980 | De Boynton | 74/25 |
| 4,246,802 | 1/1981 | Rasmussen et al. | 74/25 |
| 4,253,342 | 3/1981 | Uhing | 74/89 |
| 4,411,166 | 10/1983 | Marcovici | 74/89 |

FOREIGN PATENT DOCUMENTS 61-248955 11/1986 Japan ...................................... 74/25

OTHER PUBLICATIONS

"Roh'lix® Linear Actuators", a publication of Zero-Max, 8-1983.

Primary Examiner—Leslie A. Braun
Assistant Examiner—Scott Anchell

[57] ABSTRACT

This application relates to a device which is mounted onto a threadless shaft and which converts the rotary motion of the shaft into linear translation of the device. The device includes two blocks which have an axial bore therethrough and a plurality of roller bearings, four of which are disposed on the block called the adjusting block and two of which are disposed on the block called the mounting block. The adjusting block carries the tensioning devices which generate the friction between the bearings and the shaft. The mounting block is the component to which both the driven load and the adjusting block are secured. Pins are provided so that the blocks will always be assembled in the same orientation as they were when they were machined.

10 Claims, 5 Drawing Sheets

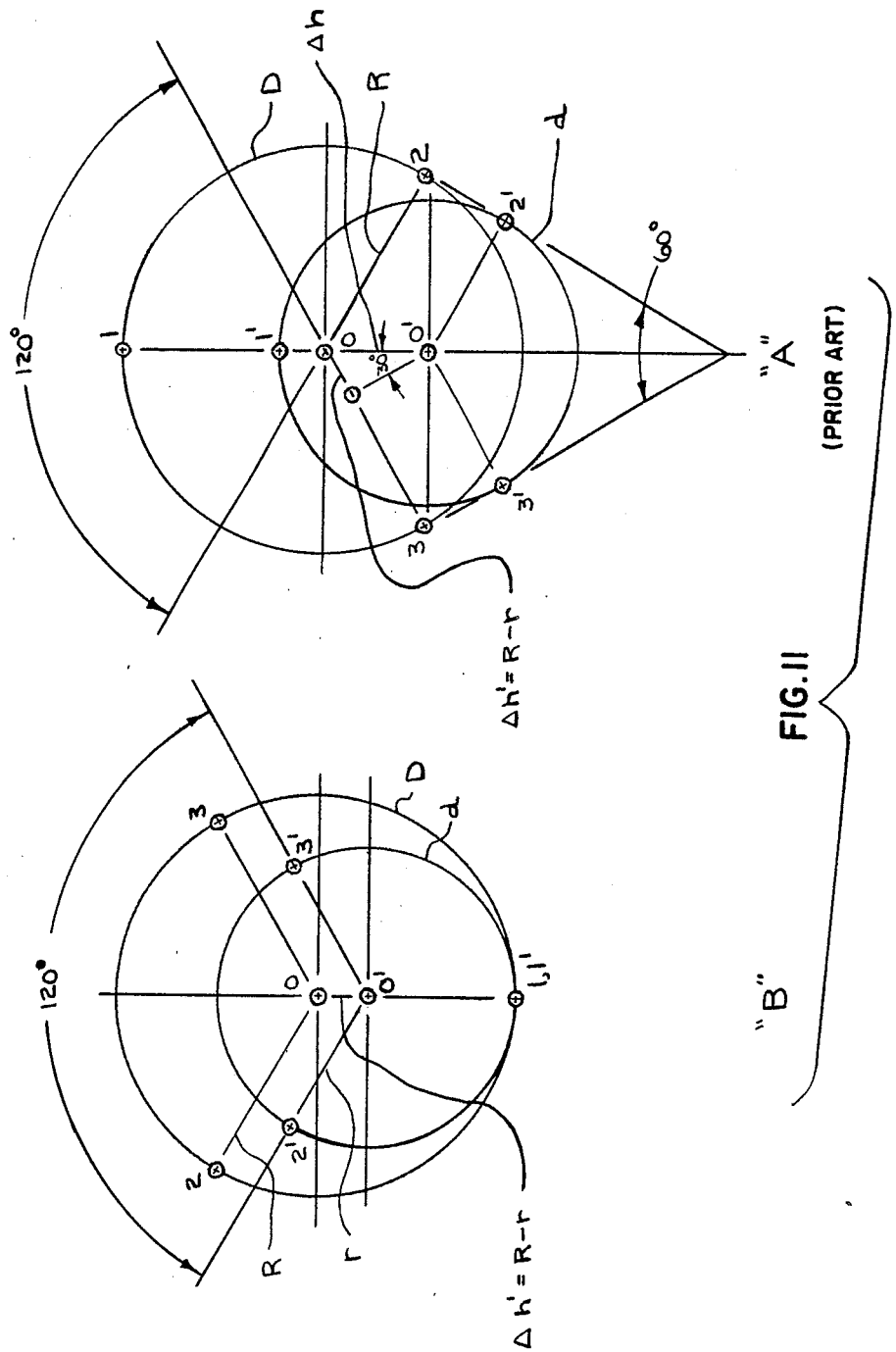

ROTATIONAL TO LINEAR ACTUATOR

RELATION TO OTHER APPLICATIONS

This application is a continuation in part of our co-pending application Ser. No. 214,705, filed Jul. 1, 1988, now abandoned.

BACKGROUND OF THE INVENTION

This invention relates to devices which are useful in converting the rotational movement of a threadless shaft into linear motion imparted from the threadless shaft to the device. Such a device is fully described in basic form in U.S. Pat. No. 3,272,021 issued Sept. 13, 1966 and which is incorporated herein by reference. The invention relates to improvements in construction which result in a performance improvement to the device.

The device is shown in the aforesaid patent finds one application as a driver for automobile power windows. The device is comprised of two blocks which are drawn toward each other by screws acting through the springs. The blocks are each formed with a U-shaped track which after assembly forms a curvilinear bore. There are roller bearings at each end of the device; and, in particular each block has roller bearings associated with itself. In the above-described device, four roller bearings are associated with each block, two at each end of the block. Further, since there are two blocks to the device, the device includes a total of eight roller bearings. The roller bearings are each skewed with respect to the shaft to establish a lead angle which determines the amount of travel of the device as the shaft rotates.

The prior art further includes a similar device to the previously described patented device which is sold by the Barry Wright Corporation under the registered trademark Roh'lix. In that device, there are a total of six bearings instead of the eight bearings previously mentioned. The orientation of the bearings in the device is such that each block contained a total of three bearings, two at one end and one at the other end. Upon assembly, the blocks are assembled so that there are three bearings at each end of the block, two on one block and one on the other. This construction required that the blocks be formed in complementary fashion with opposite vertical faces such as a lap joint. This device, although well received in the market place, experiences certain undesirable characteristics which are addressed by the present invention.

One such undesirable characteristic is the lack of position repeatability. For example, because of the manner in which forces act on the device for each shaft revolution, it travels a different distance in one direction on the shaft than in the other direction. Likewise, there is a thrust variation caused by directional reversal so that thrust in one direction is different than thrust in the opposite direction.

The prior art further includes a similar device described in basic form in U.S. Pat. No. 4,411,166. In this device, the two blocks are pivotably associated with each other. Two bearings are placed on a pivoting block and four bearings are placed on a fulcrum block. The undesirable characteristics shared by this device and others of the prior art are their sensitivity to manufacturing tolerances affecting bearing placement and sensitivity to variations in the shaft size and shaft geometry upon which it will be disposed. The result of these sensitivities is an inordinate effect on the relationship between the drive shaft and mounting surface of the actuator.

It is an object of this invention to provide a device for converting rotational shaft motion into linear movement of the device which will have improved repeatability with respect to directional travel.

It is another object of this invention to provide a device for converting rotational shaft motion into linear movement of the device which will have less variation in thrust based upon directional travel.

It is further an object of this invention to produce device of the type previously mentioned which will improve load sharing among the bearings including the periods during static loads.

Another object of this invention is to produce a device which is less sensitive to the dimensional variations resulting from its manufacture and variations in shaft dimensions and geometry, thus improving the relationship between the drive shaft and the mounting surface of the device.

It is also an object of this invention to produce a device for converting rotational motion into linear movement where the manufacturing tolerances which position the bearings and where variations in drive shaft size and geometry have less effect on the relationship between mounting components.

Further, it is an object of the present invention to provide a device wherein the component blocks are assembled in such a manner as to minimize variations in the positioning of the blocks during final assembly from the positioning of blocks during the original machining process.

Other objects and advantages of the invention will become apparent from the following detailed description of the invention and the appended drawings.

SUMMARY OF THE INVENTION

The invention in its preferred embodiment comprises a device for translating the rotational movement of a threadless shaft into linear movement of the device wherein the device includes a pair of blocks which are each formed with a substantially U-shaped track so that there is a curvilinear bore formed through the pair of blocks when assembled. One of the blocks is a mounting block and has two bearings and a means for mounting a load on it. The other block is an adjusting block and has four bearings on it. The blocks are held together by a fastening means which includes a pair of screws that act through springs to provide a variable compressive force which tends to bring the adjustable block toward the mounting block in a direction normal to the threadless shaft and therefore generating a variable frictional force between the assembled blocks and the shaft which is rotationally mounted within the bore. The mounting block is fashioned such that its two bearings are arranged with one at each end whereas the adjusting block includes four bearings, two each end of the block. Each of the bearings is skewed with respect to the threadless shaft. In addition, pins are disposed on the blocks for positioning them in the same-as-machined orientation.

BRIEF DESCRIPTION OF THE DRAWINGS

FIG. 11 shows two views of two different relationships between the rollers and the shaft which they engage. One of the views is of the prior art and the other is of the arrangement of the present invention.

DETAILED DESCRIPTION OF THE INVENTION

Figure 1:
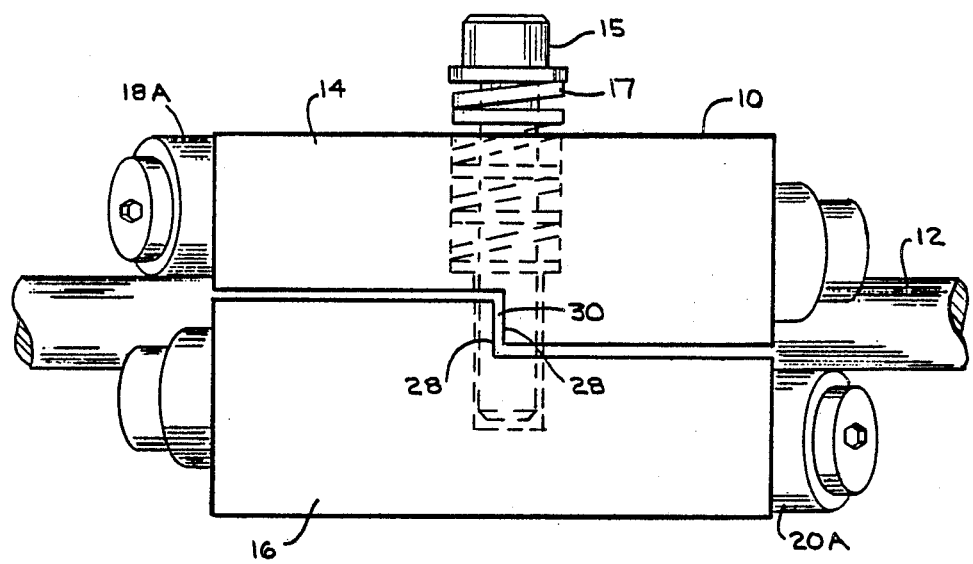
FIG. 1 is an elevation view of a prior art example of a device for translating rotational motion of a shaft into linear movement of the device.
Figure 2:
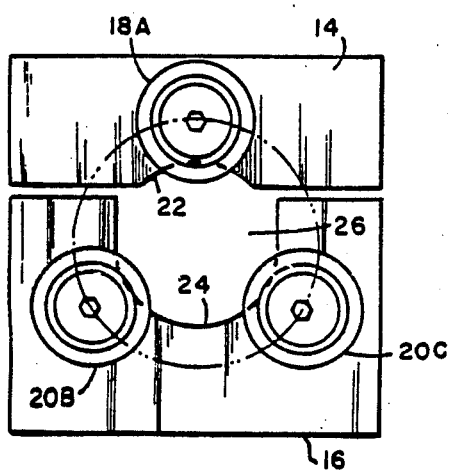
FIG. 2 is a view at one end of the prior art device with the shaft removed. This view corresponds to the left side of FIG. 1 looking axially inward.
Figure 3:
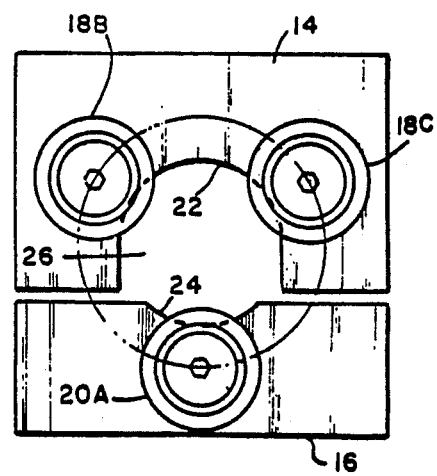
FIG. 3 is a view at the other end of the prior art device with the shaft removed. This view corresponds to the right side of FIG. 1 looking axially inward.

Referring to FIG. 1, a prior art device 10 for converting the rotary motion of a threadless shaft 12 into linear movement of the device 10 includes a pair of blocks 14 and 16 which are fastened together so as to apply a variable pressure and therefore generating variable friction on the threadless shaft. Block 14 includes three bearings, 18A, 18B and 18C with bearing 18A at one end of the block (FIG. 2) and bearings 18B and 18C at the other end of the block (FIG. 3). Likewise, block 16 is formed with three bearings 20A, 20B and 20C with bearing 20A at one end of the block (FIG. 3) and bearings 20B and 20C at the other end of the block (FIG. 2). It is important to realize that the arrangement of the prior art has a block with two bearings on an end mating with another block with one bearing on that end. The reverse is used for the other end. Block 14 is formed with a U-shaped track 22 and block 16 is formed with a U-shaped track 24. As viewed from the end view of FIG. 2, the two U-shaped tracks together form a curvilinear axial bore 26. Each block is formed with a step 28, whereupon after the blocks are assembled, the steps interface at joint 30. With respect to FIG. 1, taken in combination with FIG. 2 which shows a left side end view, the upper block 14 contains one bearing at the end whereas the lower block 16 contains two bearings at the left end, hence the lower block has a greater depth and so it appears that the track 24 has a greater depth. The opposite is true of the right end wherein it appears that the track 22 has the greater depth. Also, there are two fasteners 15 (only one shown), each including a spring 17 which provides a variable compressive force, which is also prior art, of the block against the rotatable shaft.

Figure 4:
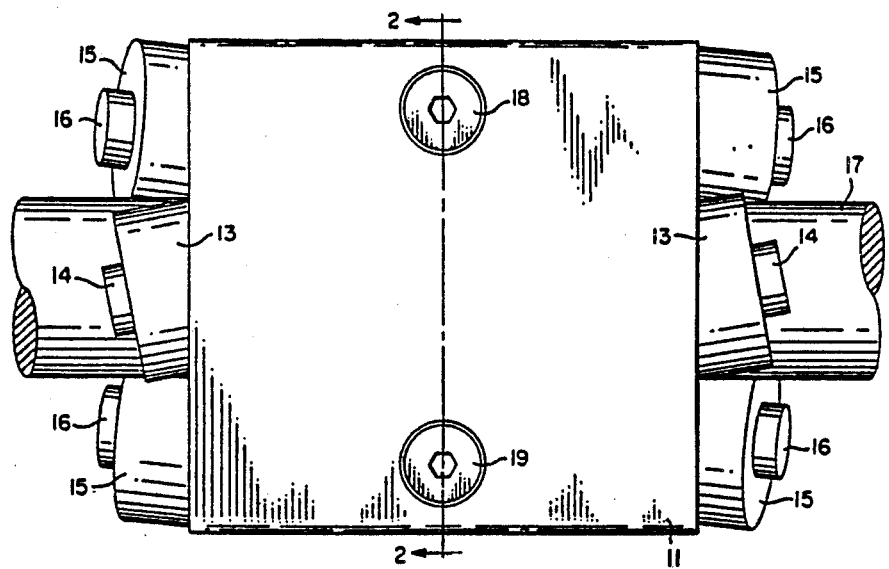
FIG. 4 is a top plan view of a linear actuator described in U.S. Pat. No. 4,411,166.
Figure 5:
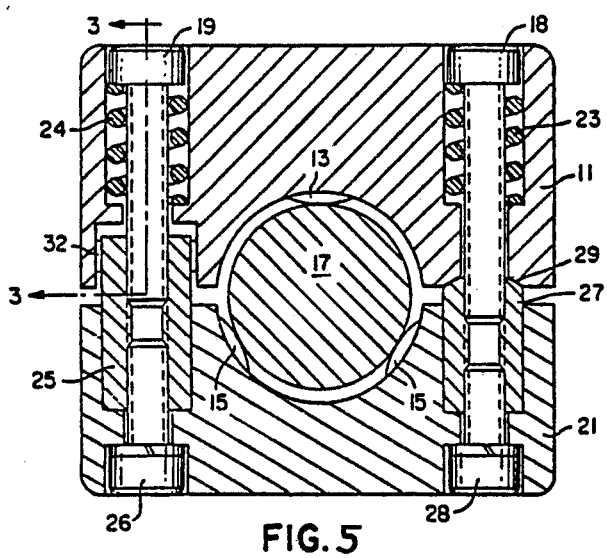
FIG. 5 is an elevation view taken in section at 2—2 of FIG. 4.

As seen in FIGS. 4 and 5, (which also is prior art) the actuator comprises a pair of body members 11 and 21 on which are mounted, respectively, rollers 13, 15 and 15. These roller members are distributed in a regular manner about the circumference of drive shaft 17. Block 11 shows one bearing at each end and block 21 shows two bearings at each end. Block 11 is described as the pivoting block and block 21 is described as the stationary block, the pivoting being around point 29. Because of the arc traveled by the pivoting block 11, a single point contact provided by the single bearing 13 is necessary to maintain a fixed relationship between the actuator and components mounted to the device.

Figure 8:
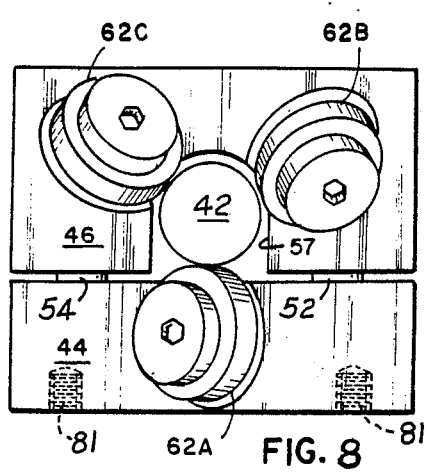
FIG. 8 is a view at the other end of the device, similar to FIG. 3 with the shaft shown in place.
Figure 7:
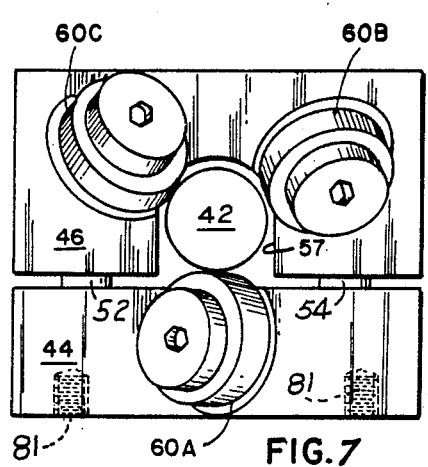
FIG. 7 is a view at one end of the device, similar to FIG. 2, except with the shaft shown in place.
Figure 6:
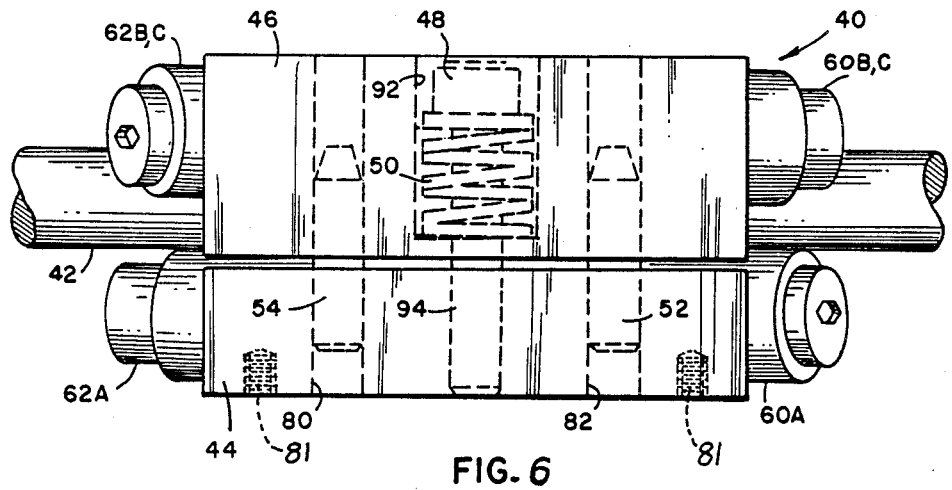
FIG. 6 is an elevation view of the device in accordance with the present invention and showing hidden parts in phantom.

FIGS. 6 to 8 show the device of the present invention. The device 40 for translating rotation of shaft 42 into linear movement of the device includes a mounting block 44 having less depth and an adjusting block 46 having greater depth. The blocks are joined together by a air of fasteners 48 (only one shown) each including spring 50. In the prior art of FIGS. 1 to 3, the fasteners 15, each having a spring 17 as shown in FIG. 1, were mounted right on the location for the lap joint 30 which meant that a portion of each of the fasteners would be on the side of the lap joint which has less depth. This mounting caused the fastener to extend beyond the upper surface of block 14 which was undesirable from the point of view of aesthetics and also required more clearance in the surrounding mounting area. One advantage of the present invention where both fasteners are mounted in the block 46 having greater depth is that the fasteners and their associated springs do not have to be exposed. There is one spring located on each side of the shaft 42 in symmetrical fashion. The blocks 44 and 46 are further aligned during assembly by a pair of locater pins 52 and 54 which are internal within the two blocks 44 and 46.

The mounting block 44 having less depth includes a total of two roller bearings 60A and 62A whereas the adjusting block 46 having greater depth contains a total of four roller bearings 60B, 60C and 62B, 62C, two each located at respective opposite ends of the block. This construction is different than the prior art which reversed the order of bearings at each end from top to bottom so that at one end there was one bearing on top. According to one aspect of the present invention, we use one bearing at each end of the mounting block and two bearings on each end of the adjusting block. The present invention as shown in FIGS. 6 through 8, also includes "U" shaped channels in each block such as represented by 57 in mounting block 46 (not visible in the adjusting block 44) but understood to define a curvilinear bore through the device when the blocks are assembled.

The advantages of this arrangement compared to the prior art described above are as follows. The position repeatability of the device is improved so that the position repeatability error is reduced to one tenth of that in the prior art which had different bearing arrangements at each end top and bottom, as previously described. Likewise, the thrust variation caused by direction reversal is reduced from approximately 40 percent to 10 percent. This is because the new device in accordance with the present invention is identical on both ends with respect to the bearings, albeit different from top to bottom, whereas the prior art containing a total of six bearings is different at one end than at the other end. The three bearing arrangement at each end is superior to known prior art bearing arrangements which contained four bearings at each end, two on top, two on the bottom at each end because the three bearings arrangement at each end provides a kind of self-centering effect between the shaft and the bearings which is not available in the four bearing arrangement. Other advantages provided by the present invention over the previous six bearing designs include less variation in location of the mounting surface of the device to the driving shaft due to variations of the shaft diameter/geometry and manufacturing tolerances. Also, there is better load sharing by the bearing which will extend bearing life and in the case of "hanging" loads, there is less bearing brinelling under static load conditions because the "hanging" load is supported by four bearings instead of two. Also, there is less variation in location of the mounting surface of the device to the driving shaft due to variations of the shaft diameter/geometry and manufacturing tolerances.

Figure 9:
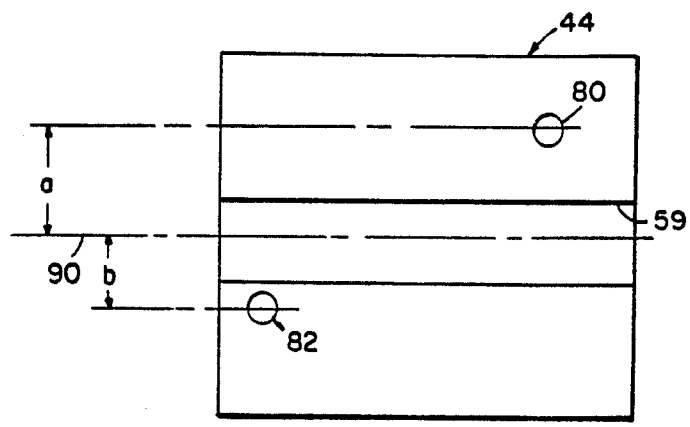
FIG. 9 is a plan view of one half of the device showing pin locater in accordance with the present invention.

As shown in FIG. 9, the "U" shaped channel 59 (not visible in FIGS. 6, 7 or 8) allows the rotatable shaft 42 to pass through the device while being held in place by the bearings. Holes 80 and 82 are formed in the adjusting and mounting blocks to accept the locater pins 54 and 52 respectively. In the manufacturing, each of the blocks is separately extruded and then holes 80 and 82 are drilled so that the blocks may be assembled for further machining such as the machining necessary for mounting the roller bearings. Holes 92 and 94 (only one shown) and mounting holes 81 (from FIG. 6) are also machined at this time. Once machining is finished at each end, the blocks are disassembled from one another so that fasteners 48 and spring 50 (only one shown) may be assembled to the block. It has been discovered by the inventors that the performance of the device can be greatly enhanced if the blocks are reassembled in the same orientation and nearly the same position as when they were machined to accept the bearings. This can be explained in part by an analogy to a threaded nut which is split and then needs to be reassembled. It will work much better if the threads are aligned as they were before the nut was split.

In the prior art construction shown in FIG. 1, the locater pins were unnecessary for proper orientation since the block halves could only be reassembled in one way because of the stepped or lapped interface. The new design does not have this feature. Therefore, according to the present invention, holes 52 and 54 are asymmetrically arranged with respect to the centerline of the device. As shown in FIG. 9, this means that the distance "a" from centerline 90 is different than or unequal to the distance "b" from the centerline 90. This will guarantee that the blocks, when reassembled, will take the same position as when they were machined or exhibit a mismatch between block halves which signals incorrect assembly.

Figure 10:
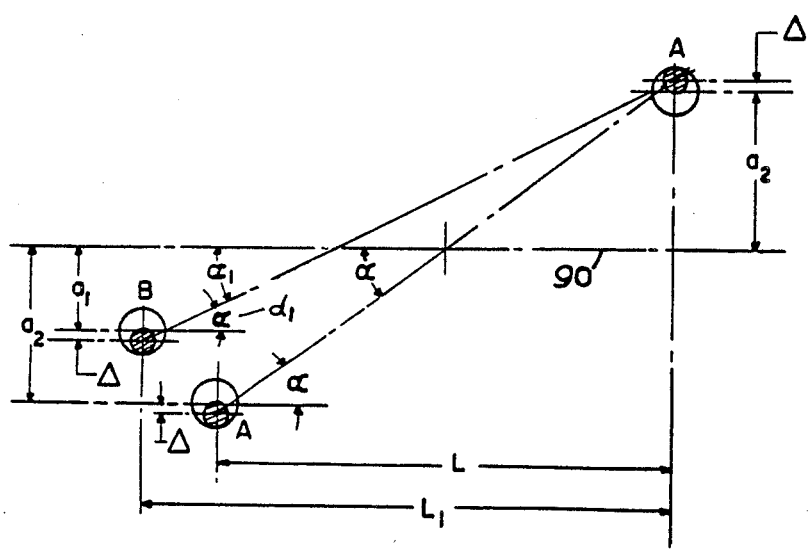
FIG. 10 is a diagram of locater pin holes in accordance with FIG. 7 showing yet another feature in accordance with the present invention.

FIG. 10 presents a geometrical comparison of asymmetrical holes "A" and "B" versus symmetrical holes "A" and "A". The centerline of a block is represented at line 90. Delta (triangle) represents the amount of clearance, in either direction, of the pin relative to the hole. Delta also represents the amount of deviation or relative movement between the top and bottom blocks and is a function of the angle alpha for the symmetrical holes "A" and "A" and alpha$_1$ for the asymmetrical holes "A" and "B". The smaller the angle alpha or alpha$_1$, the smaller the displacement between the two blocks and therefore the better fit and function, in accordance with the present invention. Further in accordance with FIG. 10, a$_1$ is the distance between the nonsymmetrical hole and the center line 90 whereas a$_2$ is the distance between the symmetrical hole and the center line.

$$\text{Tan alpha} = \frac{a_2 + a_2}{L} ; \text{ and, Tan alpha}_1 = \frac{a_2 + a_1}{L_1}$$

where a$_2$ is greater than a$_1$; and L$_1$ is greater than L

Therefore tan alpha$_1$ is less than Tan alpha; and alpha$_1$ is less than alpha.

The less angle of deviation, means the less deviation from the original position of the parts when the blocks are assembled thereby resulting in better performance.

Referring now to FIG. 11 of the drawings, the following comparisons between prior art devices and the device of the present invention is made. Because spring loaded linear actuators of the general type described here are adversely affected by sideloads, we have found that it is good practice to carry the load on a separately supported carriage. Ball bushings running on shafts located parallel to the drive shaft is an example of a typical application. In such a case, maintaining parallelism between the drive shaft and the mounting surface of the actuator is desirable. Also, because the distance between the driving shaft and the load support is often fixed, a predictable shaft-centerline-to-mounting-surface relationship is desirable.

A novel element of the present invention is the bearing arrangement. FIG. 11 presents a mathematical estimate of how two different bearing arrangements accommodate drive shaft size variation. It follows that machining variations that affect the bearing bolt circle diameter will produce similar results. The accuracy of the relationship between drive shaft centerline and the actuator body is significantly improved by the present design.

The following assumptions were made to simplify calculations:

(1) "Accuracy" is the amount of deviation of the shaft centerline relative to the base of the stationary block. Deviations can be from a nominal desired height (although parallel) or angular.

(2) The graphic representation of the shaft depicts the sum total of the dimensional deviations in all the components: For example, bolt circle of bearing screw holes, shaft diameter, bearing angle, bearing concentricity to screw thread.

(3) Bearings are solid with no deformation or radial "play".

(4) Form imperfections of the drive shaft fall within outside diameter tolerances.

(5) When two bearings are placed at the end of a block, they are considered part of a V-block with a 60° included angle.

(6) The linear actuators being compared have equal distances between the two sets of bearings at each end of the blocks.

Legend:

D,d —Diameter of the driving shaft in contact with the rollers at each end of the device respectively, they are never the same.

R, r —Radius of the driving shaft in contact with the rollers at each end of the device respectively, they are never the same.

1,2,3,1',2',3'—Points of contact of the rollers with the driving shaft.

0,0'—Location of the centerline of the driving shaft at each end of the device.

Delta h, Delta h'—Deviation of the centerline of the driving shaft from "perfect" position due to manufacturing tolerances and variations in shaft size/geometry.

View "A" —Represents prior art (four bearings in the mounting block)

View "B" —Represents present invention (two bearings in the mounting block)

Accuracy of unit can be measured by Delta H, Delta h', the amount of "walking" of the center of the driving shaft from one set of the bearings to another.

It follows from the drawing:

For the present invention: Delta h' = R-r

For the prior art: Delta h = Delta h'/Sine 30° or Delta h is about: equal to 2 Delta h'

Due to manufacturing tolerances and variations in shaft/size/geometry, the centerline of the driving shaft of the prior art design would "walk" about twice as much as the centerline of the design according to the present invention. The bearing arrangement of the present invention allows the use of the actuator in demanding applications without additional after-assembly machining operations.

Although it is apparent that changes and modification can be made within the spirit and scope of the present application, it is our intention, however, only to be limited by the appended claims.

As our invention, we claim:

1. An improved device for translating rotational movement of a threadless shaft into linear movement of the device comprising:
   a mounting block being in a fixed radial position relative to the axis of said shaft and an adjusting block, said adjusting block being radially movable relative to the axis of said shaft, said mounting block and said adjusting block being assembled together to provide an axial bore, said blocks further being spaced from and out of contact with each other, opposed surfaces of each of said blocks being on single lanes, each of which is disposed substantially parallel to the other;
   a plurality of roller bearings at each end of the device, said plurality consisting of two roller bearings at each end of the adjusting block and one roller bearing at each end of the mounting block, each of the roller bearings being skewed with respect to the threadless shaft;
   fastening means including at least two spaced-apart tensioning means, each of which is disposed on opposite sides of the axis of said shaft, said fastening means unrestrainably urging the roller bearings on said blocks against said shaft in a direction normal to the axis of said shaft; and
   means solely on said mounting block for attaching a load thereto.

2. The device according to claim 1 wherein said tensioning means includes springs that are disposed on said adjusting block, said spring tensioning means generating friction between said bearings and said shaft.

3. The device according to claim 1 further including means disposed on said blocks to always dispose the blocks in the same-as-machined orientation.

4. The device according to claim 1 further including means for mating the blocks in the same-as-machined orientation whenever the blocks are assembled, said mating means including at least two locater pin holes in each block on opposite sides of the axial bore, each locater pin hole being positioned toward a respective opposite end of the blocks whereby the pin holes are asymmetrically located relative to the actual bore whereby said blocks can only be reassembled in the exact same as machined orientation due to the asymmetry of said pin holes and said pins.

5. The device according to claim 1 wherein the mounting block has less depth than the adjusting block.

6. The device according to claim 1 wherein the adjusting block moves relative to the mounting block in a direction normal to the axis of said shaft.

7. The device according to claim 1 wherein the fastening means includes a bolt passing through a hole in said adjusting block and engaging threads in said mounting block, the head of said bolt engaging the end of a spring that surrounds said bolt and is disposed between said head and a shoulder in said hole, whereby turning of said bolt will increase or decrease the tension on said spring and thus change the pressure exerted by said roller bearings on said shaft.

8. The device according to claim 1 wherein the mounting block is the component to which both the driver load and the adjusting block are secured.

9. An improved device for translating rotational movement of a threadless shaft into linear movement of the device comprising:
   an adjusting block and a mounting block, said blocks being assembled together to provide an axial bore;
   a plurality of roller bearings at each end of the device including two bearings at each end of the adjusting block and one roller bearing at each end of the mounting block, each of the roller bearings being skewed with respect to the threadless shaft;
   fastening means including spring means to urge said roller bearings on said blocks together and against said threadless shaft; and
   means for mating the blocks in the exact same as machined orientation whenever the blocks are reassembled, said mating means including at least two locater pin holes in each block on opposite sides of the axial bore, each locater pin hole being positioned toward a respective opposite end of the blocks whereby the pin holes are asymmetrically located relative to one another and the actual bore whereby said blocks can only be reassembled in the exact same as machined orientation due to the asymmetry of the said pin holes and said pins.

10. The improved device recited in claim 9 wherein one of the locator pin holes is closer to the axial bore than the other locator pin hole.

* * * * *